United States Patent [19]

Schiel

[11] Patent Number: 4,676,117
[45] Date of Patent: Jun. 30, 1987

[54] SPUR-GEAR SYSTEM

[75] Inventor: Christian Schiel, Heidenheim, Fed. Rep. of Germany

[73] Assignee: J.M. Voith GmbH, Fed. Rep. of Germany

[21] Appl. No.: 641,441

[22] Filed: Aug. 16, 1984

[30] Foreign Application Priority Data

Aug. 20, 1983 [DE] Fed. Rep. of Germany ....... 3330204

[51] Int. Cl.$^4$ .................. F16H 1/06; B21B 13/02
[52] U.S. Cl. ................. 74/421 R; 74/432; 29/116 AD
[58] Field of Search .......... 74/421 R, 410, 411, 74/399, 398, 396, 395, 397, 443, 432; 29/116 AD, 116, 115

[56] References Cited

U.S. PATENT DOCUMENTS

| | | | |
|---|---|---|---|
| 2,674,898 | 4/1954 | Mudersbach | 74/399 |
| 2,676,387 | 4/1954 | McArn | 29/116 AD |
| 2,696,743 | 12/1954 | Odman | 74/399 |
| 2,867,130 | 1/1959 | Moeller | 74/443 |
| 3,648,533 | 3/1972 | Parenti | 74/410 |
| 3,678,775 | 7/1972 | Danielsson | 74/410 |
| 3,766,620 | 10/1973 | Roering | 29/115 |
| 3,889,334 | 6/1975 | Justus et al. | 29/115 |
| 4,271,574 | 6/1981 | Matikainen | 74/410 |
| 4,325,170 | 4/1982 | Verboom et al. | 29/116 AD |
| 4,399,747 | 8/1983 | Schiel et al. | 29/116 AD |
| 4,402,233 | 9/1983 | Toivonen et al. | 74/411 |
| 4,414,890 | 11/1983 | Schiel et al. | 100/162 B |
| 4,440,077 | 4/1984 | Schiel | 29/116 AD |
| 4,459,726 | 7/1984 | O'Brien et al. | 29/116 AD |

FOREIGN PATENT DOCUMENTS 826228 7/1949 Fed. Rep. of Germany .
96674 9/1977 France .

Primary Examiner—Allan D. Herrmann
Attorney, Agent, or Firm—Ostrolenk, Faber, Gerb & Soffen

[57] ABSTRACT

The invention relates to a spur-gear system for driving a roll shell which bears an outer gear-wheel on one of its ends. The roll shell and the outer gear-wheel are monted via a common self-aligning bearing which is disposed concentrically within the outer gear-wheel. A pinion gear-wheel meshing with the outer gear-wheel is also mounted via a self-aligning bearing disposed concentrically within it. Both self-aligning bearings are mounted on the same support in the form of a cap. The outer gear-wheel and the pinion gear-wheel each have an abutment rim on one side. The contact surfaces thereof roll against each other during normal operation so that the axes of the two gear-wheels are parallel with each other. A geared coupling shaft driving the pinion gear-wheel is inclined in such a way that the pitching moment acting on the pinion keeps the two abutment rims in contact with each other.

13 Claims, 5 Drawing Figures

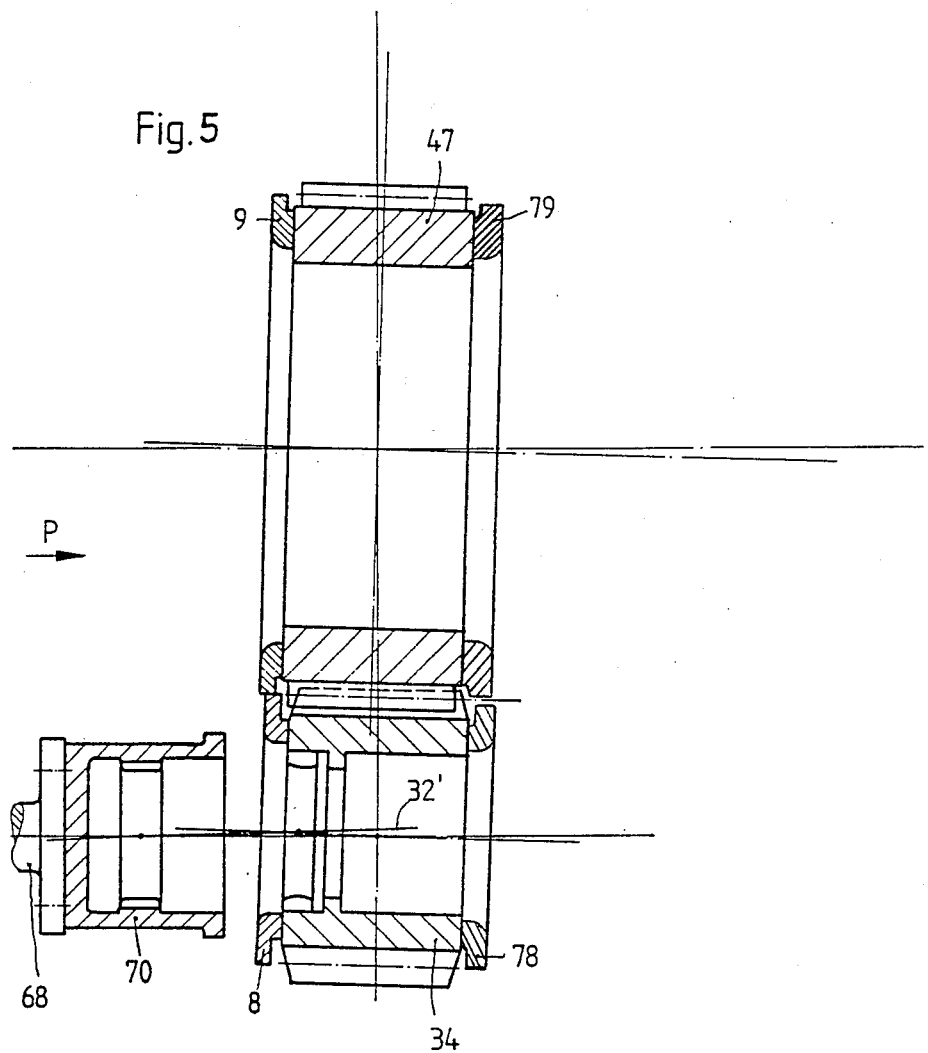

SPUR-GEAR SYSTEM

BACKGROUND OF THE INVENTION

The present invention relates to a spur-gear system of the kind having an outer gear-wheel adapted to be rigidly connected to a component which is to be driven, said outer gear-wheel being mounted, via a common self-aligning bearing disposed at least approximately concentrically within the outer gear-wheel, on a support, and a pinion gear-wheel which meshes with the outer gear-wheel also mounted on the support via a self-aligning bearing disposed concentrically within the gear-wheel.

Such a spur-gear system is especially suitable for driving a hollow roll shell rotating round a stationary inner part. Such rolls are, for example, flexion adjusting rolls or suction rolls, such as those used in the paper industry in dewatering presses, calenders or the like. A particularly appropriate application for the invention is for the so-called equidistantly mounted flexion adjusting rolls where the bearings of the roll shell, the bearings of the mating roll and the spheroidal mountings for the yoke (the flexion support extending through the roll shell) are disposed with at least approximately the same distance between them.

A spur-gear system of the above kind is known from German laid-open Patent Specification (DE-OS) No. 30 24575, FIG. 3, which correponds substantially to U.S. Pat. No. 4,414,890. In the prior art system, the outer gear-wheel of the spur-gear system is rigidly connected to the roll shell. Disposed concentrically inside the outer gear-wheel there is a self-aligning bearing; that is the center point of the self-aligning bearing lies at least approximately in the central plane of the outer gear-wheel, this plane extending perpendicular to the axis of rotation of the roll. A pinion gear-wheel which meshes with the outer gear wheel is mounted in a similar way. This gearing system, which is extremely simple in comparison with other known designs, enables the two gear-wheels to adjust to a certain extent into an inclined position during operation. A position which is inclined at a relatively small angle may arise, for example, if the roll shell flexes during operation. A position which is inclined at a relatively large angle arises if the entire roll, when either idling or stopped, is swung out of a rest position into an operating position or back again. In the latter case, it must be borne in mind that the pivot levers do not generally move exactly synchronously.

The above publications thus disclose a development step in the right direction. However, it has subsequently been realized that the pinion gear-wheel could swing perpendicular to the engagement plane of the teeth during operation. That is to say, it could incline by a small angular amount out of the normal position in which the axes and tooth flanks of the two gear-wheels lie parallel to each other. As soon as the pinion gear-wheel inclines, contact between the teeth will occur only in a narrow area in the center of the gear-wheels, so that there is a danger of over-loading at that location. The inclining or swinging of the pinion gear-wheel will occur whenever there is an asymmetrical load, for example, due to any alignment error between the roll shell and the drive shaft.

The object of the present invention is to improve the gear system described in DE-OS No. 30 24 575 so that the axes of the two gear-wheels remain parallel during normal operation.

BRIEF DESCRIPTION OF THE INVENTION

In accordance with the invention, a pair of abutment rims are provided on only one of the two faces of the outer gear-wheel and the pinion gear-wheel. The outer surfaces of the abutment rings define running surfaces which rotate in abutment with one another and whose diameter is dimensioned so that the teeth of the two gear-wheels are as exactly parallel to each other as possible when the abutment rims roll against each other in operation. The diameters of the contact surfaces of the abutment rims can each be the same as the pitch circle. However, it is also possible to deviate from this provided that the sums of the diameters of the contact surfaces and of the pitch circles are the same. The contact surfaces of the rims may be made cylindrical or cambered.

Since each abutment rim is provided on only one of the two opposite faces of its respective gear-wheel, it is possible to have occasional greater inclination of the roll shell, which may arise when the roll is swung when idling or stopped. It must be borne in mind that when such inclining occurs, the axial distance between the two gearwheels is reduced slightly. However, such a reduction in the axial distance, when the pinion gear-wheel is inclined relative to the outer gear-wheel, is only possible when abutment rims are provided on only one side of the gear-wheels. In other words, if a pair of abutment rims were provided on the other side of the pair of gear-wheels as well, the roll shell would be prevented from inclining, or the inclination would cause jamming or damage to the abutment rims. However, as will be explained further below, under certain circumstances, it is possible to provide additional rims, which are used for a different purpose, on the other side of the pair of gear-wheels. In this case, there must be sufficient play between these additional rims for the roll shell still to be able to incline.

Further provisions may be made to ensure that the contact surfaces of the two abutment rims are in contact (i.e., rolling against each other) during operation of the gear system, despite the fact that there is only a single pair of abutment rims. Two possible alternatives for this are disclosed, both involving a pitching moment which forces the rims together. One alternative involves the use of helical gear teeth disposed in such a manner that the pitching moment resulting from the axial components of the force of the gear teeth on the pinion gear-wheel maintains the abutment rims in contact with one another. However, this measure can have the desired effect in one rotary direction only. The other alternative inclines an articulated shaft driving the pinion gear-wheel, by mounting a drive shaft which drives the articulated shaft eccentrically relative to the pinion gear-wheel. Preferably, a geared coupling shaft will be provided as the articulated shaft. The inclination of this geared coupling shaft must have a component parallel to the line of contact (line of action) of the gear teeth. In this way, the friction of the geared coupling in the pinion gear-wheel produces the desired pitching moment on the pinion gear-wheel. However, in this connection, the fact must be taken into consideration that the direction of the pitching moment depends both on the direction of the inclination of the geared coupling shaft and also on the direction of the torque being transmitted. Thus, if the direction of the torque being transmitted should change (for example, by reversing the direction of rotation), then the direction of the inclination of the geared coupling shaft must also change. In all cases, with inclination of the geared coupling shaft, straight teeth (spur toothing) can be provided on the gear-wheels so that axial thrust is avoided.

As noted above, additional rims may be provided on the opposite side of the gear-wheels to the abutment rims. These rims serve the following purpose. If the drive for the roll shell is switched off, the roll shell generally continues to run at a reducing rotary speed due to the mass moment of inertia. Torque may then be transmitted in the reverse direction (braking action). In this operating state, the pinion gear-wheel inclines relative to the outer gear-wheel so that the abutment rims are lifted away from each other on one side and the edges of the teeth draw closer to each other on the other side. This gives rise to the danger that the edges of the teeth will jam against the bottom of the toothspace. This danger can be eliminated by the additional rims which thus form an inclination limiting device.

Instead of the additional rims described above, an inclination-limiting ring can be provided inside the pinion gear-wheel, supported on the trunnion of the pinion bearing either so it can slide or via a roller bearing.

Other objects, features and advantages of the invention will be apparent from the following description, together with the accompanying drawings and the appended claims.

BRIEF DESCRIPTION OF THE DRAWINGS

FIG. 5 is a view similar to FIG. 2, showing an alternate embodiment which includes a second pair of abutment rims 78 and 79.

DETAILED DESCRIPTION OF THE PREFERRED EMBODIMENTS

Figure 1:
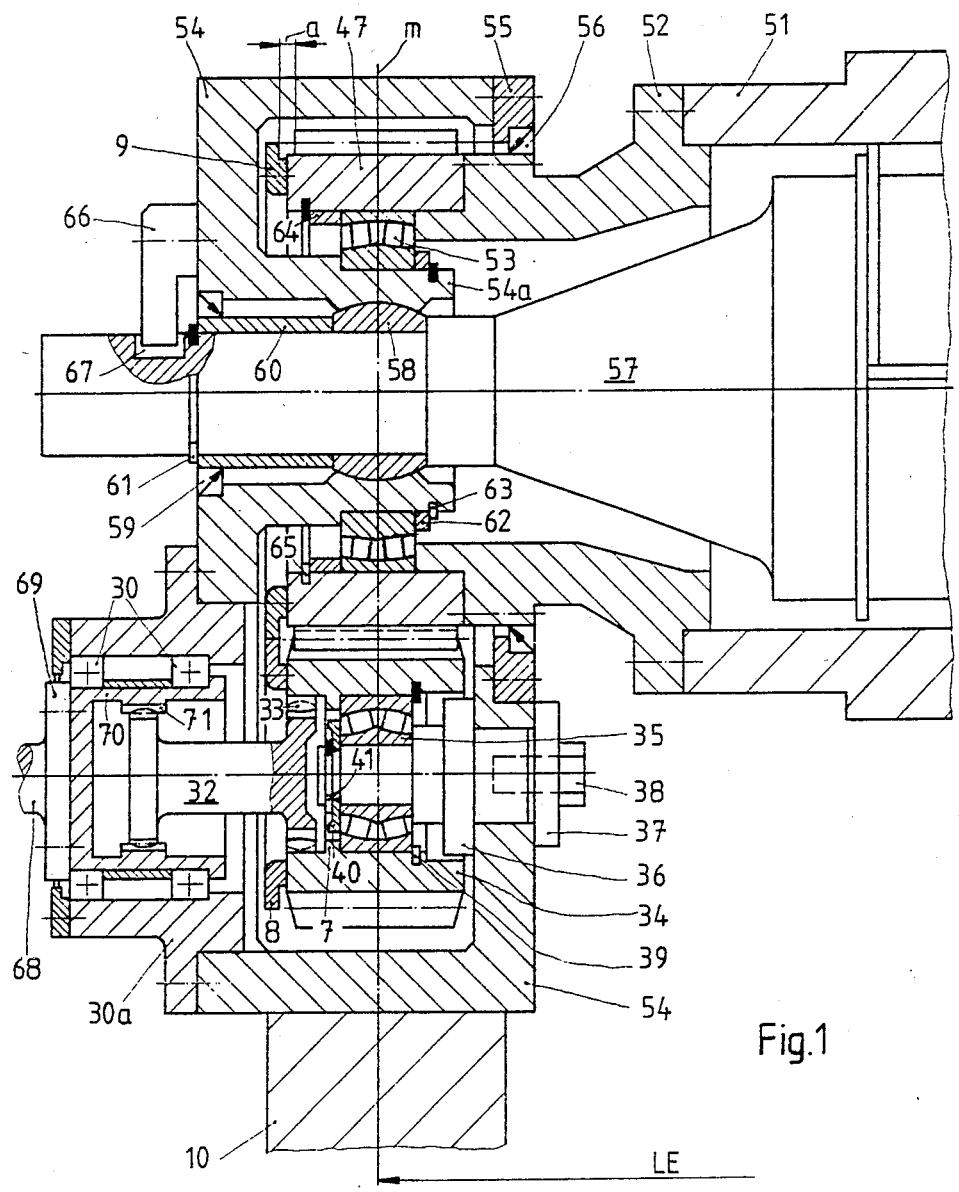
FIG. 1 shows a longitudinal section of spur-gear for the drive of a paper machine press roll with adjustable flexion.

As best shown in FIG. 1, a bearing sleeve 52, and therewith a gear-wheel 47, is screwed to a press roll shell 51 which is to be driven. The roll shell 51 is mounted via a self-aligning roller bearing 53 on a collar part 54a on the support cap 54. A stationary flexion support or yoke 57 is articulated on the collar part 54a. A sealing lip 59 seals the gap between the support cap 54 and a bushing 60 pushed onto the yoke 57. A spring washer 61 holds a spherical bushing 58 axially fixed via the bushing 60. The support cap 54 is fixed to a bearing lever, bearing piston or frame 10. The bearing 53 is secured against axial displacement relative to the support cap 54 via a supporting ring 62 and a spring washer 63. Moreover, the gear-wheel 47 is secured by support ring 64 and spring washer 65 against displacement relative to the bearing 53. A lug 66 attached to the support cap 54 projects into a groove 67 in the yoke 57 and secures the yoke 57 against rotation.

A drive shaft 68 is attached by the flange 69 to a drive sleeve 70 having gear teeth 71 formed therein. The drive sleeve 70 is mounted on two roller bearings 30, which rest in a bearing bracket 30a which is screwed to the support cap 54. Via the gear-teeth 71, the geared coupling shaft 32, and the gear-teeth 33, the drive sleeve 70 drives a drive gear-wheel 34 which meshes with the gearwheel 47. In the center of the drive gear-wheel 34, there is a spherical bearing 35. The gear-wheel 34 is pivotably mounted via this bearing on a supporting bolt 36 which is rigidly attached to the support cap 54 by means of an integral shoulder, a disc 37 and a screw 38. When the roll shell 51 bends during operation of the press roll, or when the press roll tilts for some other reason and the gearwheel 47 inclines corresponding, the gear-wheel 34 can adjust to this inclination.

Figure 2:
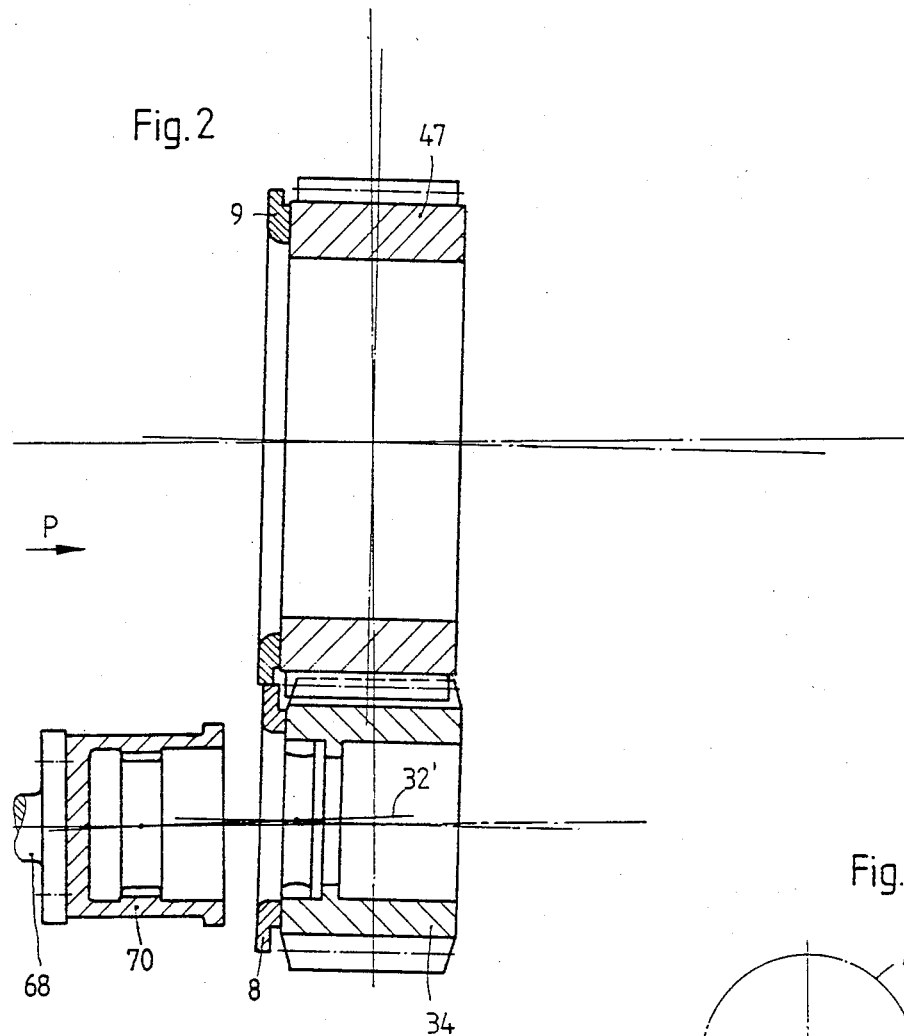
FIG. 2 shows schematically the gearing in the state where the press roll shell is flexed or inclined and the gear-wheels are correspondingly inclined.

The two sets of gear teeth 71 and 33 are angularly adjustable geared couplings. The geared coupling shaft 32 can thus incline when the pinion gear-wheel 34 tilts. This is shown schematically in FIG. 2. The two inclined gear wheels 34 and 47 can be seen, and also, in an unchanged position, the drive sleeve 70 with the drive shaft 68. Also seen is the inclined center line 32′ of the geared coupling shaft 32.

The bearing 35 is held axially fixed on one hand by a spring washer 39 in the pinion gear-wheel 34, and on the other hand by a supporting ring 40 and the spring washer 41 of the supporting bolt 36. The support cap 54 also forms a housing for the gear-wheels 34 and 47. In the vicinity of the bearing bushing 52, the inside of the gear housing 54 is sealed from the outside by means of a cover 55 and a sealing lip 56.

A mating roll and its mounting are not shown in the drawing. The center point of the bearings of the mating roll, the self-aligning bearing 53 and the spherical bushing 58 of the yoke 57 preferably all lie in the same axis which is normal central plane m (FIG. 1).

To ensure that the axes of the two gear-wheels 34 and 47 always remain parallel to each other when torque is being transmitted (i.e., when the drive is operating), despite the fact that the pinion gear-wheel 34 is mounted on a single, self-aligning bearing 35, the gear-wheels are provided with respective abutment rims 8 and 9, which have outer cylindrical surfaces in rotational engagement with each other. The engagement of these abutment rims 8, 9 assures that when the axial orientation of one of the gear-wheels 34, 47 changes, the axial orientation of the remaining gear-wheel will change in a similar manner. As shown in FIG. 1, the outer surface of the abutment rim 9 is spaced a distance a from the teeth of gear wheel 47.

Inside the pinion gear-wheel 34 next to the selfaligning bearing 35, there is an integral tilt-limiting ring 7 which can rest against the support ring 40. In the normal non-inclined position of the gear-wheel 34 (FIG. 1), and also in the inclined position when torque is being transmitted (FIG. 2), there is a sufficient gap between the rings 7 and 40 to prevent them from rubbing against each other during operation of the gear system. However, the tilt-limitation of the ring 7 can become effective when the gearing is motionless, or is coasting without transmitting any torque, or is coasting during the transmission of reverse torque (braking action). In each of these cases, the pinion gear-wheel 34 inclines in a direction opposite to the inclined position shown in FIG. 2, so that the abutment rims 8 and 9 are moved away from each other and the parallelity of the axes of the gear-wheels is thus lost. However, the tilt-limitation device prevents the edges of the teeth of a given gear-wheel from being forced against the bottom of the tooth space on the other gear-wheel.

Instead of the support ring 40, a small roller bearing on the outer ring of which the tilt-limiting ring 7 would be braced when required, could also be provided. A further possibility for a tilt-limiting device for the pinion gear-wheel 34 is shown in FIG. 5; i.e., on the opposite sides of the gear-wheels 34, 37, 47 to those bearing the abutment rims 8 and 9, respectively, additional rims 78 and 79 are provided. It will be seen that these additional rims 78 and 79 do not touch each other as long as the gear-wheels 34 and 47 are parallel with each other during normal transmission of torque (while the abutment rims 8 and 9 are in contact with each other). In other words, the external diameters of the rims 78 and 79 are somewhat smaller than the diameters of the contact surfaces on the abutment rims 8 and 9.

Figure 3:
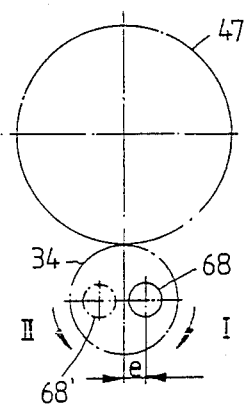
FIG. 3 shows schematically the gearing on a smaller scale than in FIG. 2, looking in the direction of the arrow P in FIG. 2.

FIG. 3 also shows how the drive shaft 68, and with it bearings 30 of the drive sleeve 70, are expediently arranged eccentric to the pinion gear-wheel 34 by a distance e, so that the geared coupling shaft 32 is tilted with respect to gear wheel 34. This produces a pitching moment on the gear-wheel 34 which keeps the outer surfaces of rims 8 and 9 in contact with each other. The circle shown as a fully-drawn line shows the position of the drive shaft 68 when the gear-wheel 34 is rotating in the direction I, while the circle drawn in broken lines shows the position of the drive shaft 68' when the gear-wheel 34 is rotating in the direction II (when torque is being transmitted from the gear-wheel 34 to the outer gear-wheel 47).

If a roll with the gearing according to the invention, is occasionally driven in one direction and occasionally in the other direction, it is expedient to arrange the roller bearings 30 of the drive sleeve 70 in the bearing bracket 30a eccentric by the distance e, and to arrange the bearing bracket 30a concentric with the gearwheel 34. Then, when the direction of rotation is reversed, the bearing bracket 30a can be rotated through 180° in the support cap 54 in order to obtain the correct direction for the pitching moment on the gear-wheel 34 again.

Figure 4:
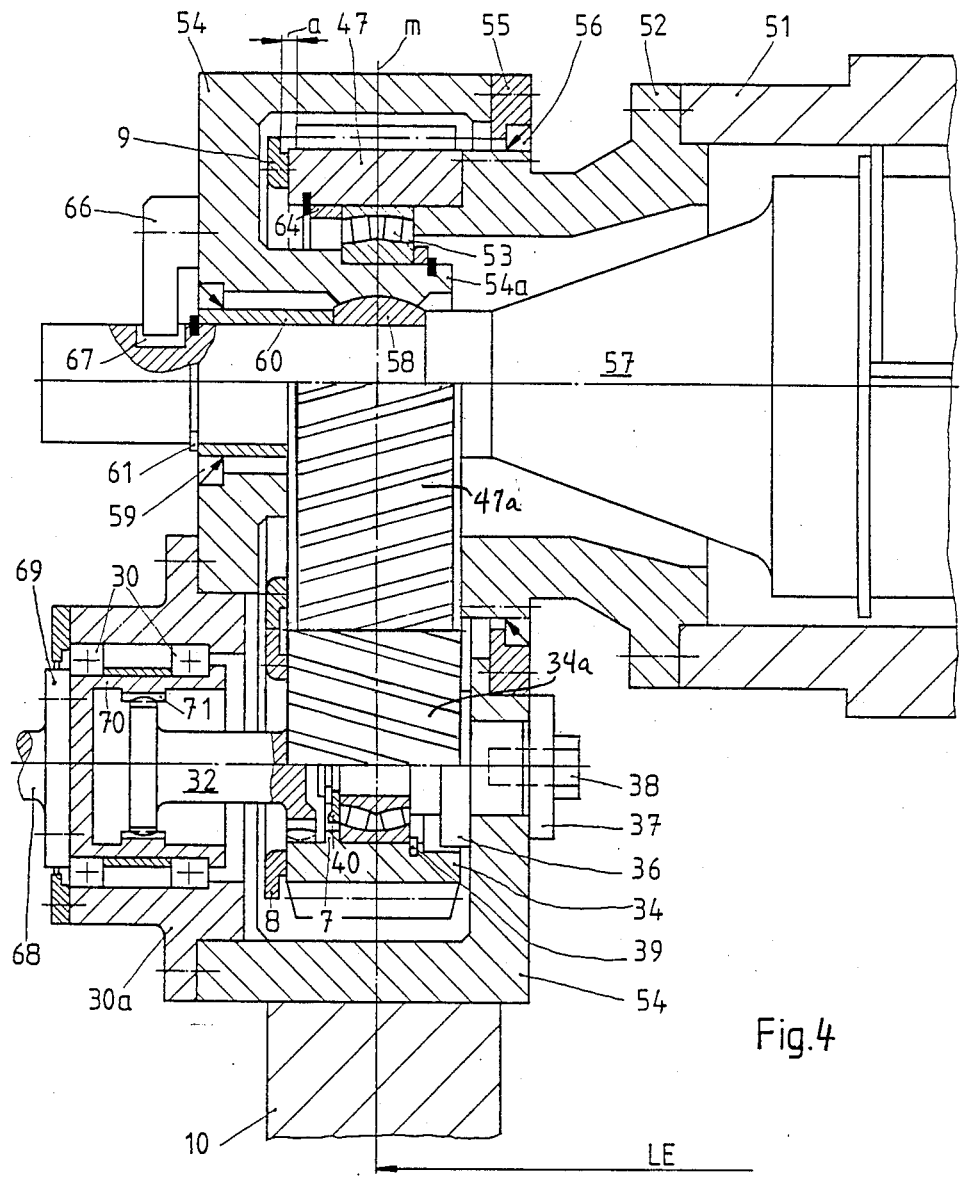
FIG. 4 is a view similar to FIG. 1, showing an alternate embodiment in which the gear-wheels 34 and 47 are presented in partial front view to show single-helical gear teeth 34a and 47a, respectively.

In an alternative embodiment, shown in FIG. 4, the desired pitching moment on the gear-wheel 34 is achieved by forming the gear-wheels 34 and 47 with helical gear teeth and by arranging the helical teeth in such a manner that the pitching moment resulting from axial components of force on the gear teeth of the pinion gear-wheel maintains the two abutment rims 8 and 9 in contact with one another. In FIG. 4, gear-wheels 34 and 47 are seen (at 34a and 47a, respectively) to have single-helical gear teeth.

While the invention has been disclosed with reference to a single stage gearing, it can also be used with two-stage gearing. In this case, the drive shaft 68 can be arranged coaxial with the roll. Between the roller bearings 30, the drive sleeve 70 is then provided with an additional gear-wheel which meshes with an additional pinion appertaining to the drive shaft.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:
1. A gear system, comprising:
an outer gear-wheel;
first mounting means for mounting said outer gear-wheel to a support structure, said first mounting means including a first self-aligning bearing disposed concentrically within said outer gear-wheel;
a pinion gear-wheel in meshing engagement with said outer gear-wheel;
second mounting means for mounting said pinion gear-wheel to said support structure, said second mounting means including a second self-aligning bearing disposed concentrically within said pinion gear-wheel;
first and second abutment rims coupled to said outer gear wheel and said pinion gear wheel, respectively, said first and second abutment rims each having a respective outer surface which is located laterally of said outer gear wheel and said pinion gear wheel; and
means for biasing said outer surfaces of said first and second abutment rims into rotational contact for rotation with each other;
wherein said biasing means includes helical teeth on said gear wheels in meshing engagement with one another, said helical teeth being so arranged that a pitching moment resulting from axial components of force of the teeth on said pinion gear-wheel maintains said outer surfaces in contact with each other.

2. A gear system, comprising:
an outer gear-wheel;
first mounting means for mounting said outer gear-wheel to a support structure, said first mounting means including a first self-aligning bearing disposed concentrically within said outer gear-wheel;
a pinion gear-wheel in meshing engagement with said outer gear-wheel;
second mounting means for mounting said pinion gear-wheel to said support structure, said second mounting means including a second self-aligning bearing disposed concentrically within said pinion gear-wheel;
first and second abutment rims coupled to said outer gear wheel and said pinion gear wheel, respectively, said first and second abutment rims each having a respective outer surface which is located laterally of said outer gear wheel and said pinion gear wheel; and
means for biasing said outer surfaces of said first and second abutment rims into rotational contact for rotation with each other;
wherein said biasing means comprises an articulated shaft driving said pinion gear-wheel, said articulated shaft having an axis which is inclined in a direction of inclination with respect to the axis of said pinion gear wheel so as to produce a pitching moment on said pinion gear-wheel in a direction which biases said outer surface of said second abutment rim into contact with said outer surface of said first abutment rim.

3. The gear system of claim 2, wherein said outer gear-wheel and said pinion gear-wheel have respective sets of straight teeth which mesh with one another.

4. The gear system of claims 3, wherein said articulated shaft is a geared coupling shaft.

5. The gear system of claims 2, further including means for adjusting the direction of inclination of the articulated shaft so that the pitching moment acting on said pinion gear-wheel may be reversed.

6. The gear system of claim 5, further including a gear element for driving said articulated shaft, said gear element being eccentric with respect to said axis of said pinion gear-wheel.

7. The gear system of claim 2, wherein said outer surfaces of said first and second abutment rims define respective diameters and are concentric with said outer gear wheel and said pinion gear wheel, respectively.

8. The gear system of claim 7, wherein said outer gear wheel and said pinion gear wheel have central axes defined therein, and the sum of the diameters of said outer surfaces is double a distance between the axes of said outer gear wheel and said pinion gear wheel as measured along a line perpendicular to said axes.

9. The gear system of claim 2, wherein said biasing means places a pitching moment on said pinion gear-wheel which pitching moment tends to cause said pinion gear-wheel to tilt in a first direction about an axis which is perpendicular to the axis about which said pinion gear-wheel rotates and wherein said system further includes a tilt-limiting ring for limiting the angle in which said pinion gear-wheel can tilt in a second direction opposite to said first direction about said perpendicular axis.

10. The gear system of claim 2, further including first and second additional rims coupled to said outer gear-wheel and said pinion gear-wheel, respectively, said first and second additional rims each having a respective outer surface which is located laterally of said outer gear-wheel and said pinion gear-wheel, respectively, on the side of said outer gear-wheel and said pinion gear-wheel which is opposite the side on which said first and second abutment rims are located, the diameters of said outer surfaces of said first and second additional rims being such that said outer surfaces will be spaced apart when said outer surfaces of said first and second abutment rims are in contact with one another.

11. A gear system comprising:
an outer gear wheel;
first mounting means for mounting said outer gear wheel to a support structure; said first mounting means including a first support for said outer gear wheel for permitting said outer gear wheel to tilt freely in its orientation with respect to said support structure;
a pinion gear wheel in meshing engagement with said outer gear wheel;
second mounting means for mounting said pinion gear wheel to said support structure; said second mounting means including a second support for said pinion gear wheel for permitting said pinion gear wheel to tilt freely in its orientation with respect to said support structure;
first and second abutment means coupled to said outer gear wheel and said pinion gear wheel, respectively; said first and said second abutment means each having a respective outer surface which is located laterally of said outer gear wheel and said pinion gear wheel;
means for urging said outer surfaces of said first and second abutment means into rotational contact with each other, such that upon rotation of said outer gear wheel and said pinion gear wheel, said first and second abutment means rotate in contact with each other;
wherein said urging means comprises an articulated shaft for driving said pinion gear wheel;
said articulated shaft having an axis which is inclined with respect to the axis of said pinion gear wheel for producing a pitching moment on said pinion gear wheel in a direction for biasing said outer surface of said second abutment means into contact with said outer surface of said first abutment means.

12. The gear system of claim 11, further comprising an angularly adjustable gear coupling between said articulated shaft and the interior of said pinion gear wheel and providing a drive connection between said articulated shaft and said pinion gear wheel thereby.

13. The gear system of claim 12, further comprising a drive shaft for driving said pinion gear wheel for rotation; said biasing means further comprising a second angularly adjustable gear coupling between said articulated shaft and said drive shaft.

* * * * *